United States Patent [19]
Fort et al.

[11] 4,001,768
[45] Jan. 4, 1977

[54] DATA ACQUISITION, TRANSPORT AND STORAGE SYSTEM
[75] Inventors: J. Robert Fort; James A. Westphal, both of Altadena; C. Hewitt Dix, Pasadena, all of Calif.
[73] Assignee: Geophysical Systems Corporation, Pasadena, Calif.
[22] Filed: May 7, 1973
[21] Appl. No.: 358,077
[52] U.S. Cl. .............. 340/15.5 FC; 340/15.5 DP; 340/15.5 GC; 346/33 C; 360/18
[51] Int. Cl.² ...................... G01V 1/24; G01V 1/22
[58] Field of Search .... 340/7 R, 15.5 CP, 15.5 GC, 340/15.5 DP, 15.5 FC, 18 P, 18 CM, 155, 172.5; 360/8, 18, 32, 43; 346/33 C; 179/15 AW; 235/151.3, 152, 154, 181; 250/264; 325/308, 309

[56] References Cited
UNITED STATES PATENTS

| 3,652,979 | 3/1972 | Angelle | 340/15.5 MC |
|---|---|---|---|
| 3,657,694 | 4/1972 | Lindsey | 340/18 P |
| 3,795,008 | 2/1974 | Kolsrud et al. | 346/33 R |
| 3,838,445 | 9/1974 | Cupp et al. | 360/18 |

Primary Examiner—Nelson Moskowitz
Attorney, Agent, or Firm—Daniel Silverman

[57] ABSTRACT

This abstract describes a system for the field recording of seismic data in which a plurality of geophone outputs are connected to an array terminal. Each geophone is connected to a fixed gain differential amplifier. A shifting function is produced which is added to the amplified geophone signal to form a sum signal which goes to an axis crossing coder, (AXC). On a first command from an array controller in a distant recording unit, the AXC is commanded to produce axis-crossing-coded pulses of the instantaneous sum signals. These pulses are stored in a parallel-to-serial converter inside the array terminal. On a second command from the array controller the converter reads out as a train of serial bits, the pulses stored in the converter. This train of single bit signals is transmitted to the array controller by a single pair of conductors, and stored on a magnetic recording means.

18 Claims, 5 Drawing Figures

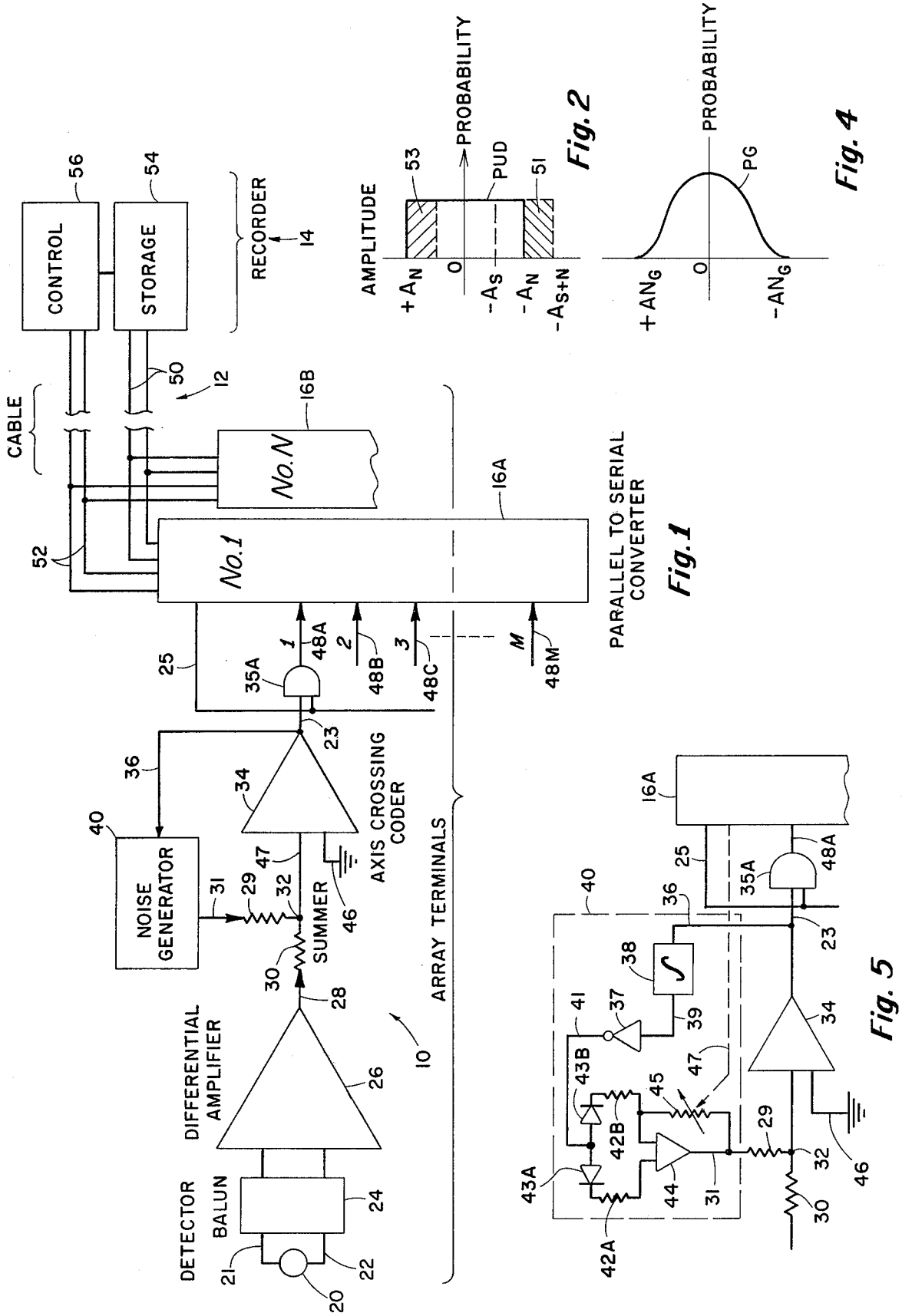

DATA ACQUISITION, TRANSPORT AND STORAGE SYSTEM

CROSS REFERENCE TO RELATED APPLICATIONS

This application is related to three other applications assigned to the same assignee as this application and filed on the same date as this application. The titles of the other three applications are as follows: DATA ARRAY NETWORK SYSTEM Ser. No. 358,097, filed May 7, 1973, now U.S. Pat. No. 3,881,116; DATA AND ARRAY CONTROL SYSTEM Ser. No. 358,078, filed May 7, 1973, now U.S. Pat. No. 3,883,725; and DATA ACQUISITION COMPOSITING AND PROCESSING SYSTEM Ser. No. 358,076, filed May 7, 1973, which has been allowed and the base issue fee has been paid.

DEFINITIONS

In this application a shifting function is defined as any time function, which when added to an analog signal causes a shift of the axis crossing times of the sum signal of the analog signal and the shifting function. Examples of shifting functions are noise, sinusoids, sawtooth time functions and so on. In this application the shifting functions may be random in at least one parameter, such as frequency, or phase, for example, and may be the sum of a plurality of shifting functions. In general, the shifting functions will be amplitude controlled in relation to the analog signals to which they are added.

For the purposes of this application the terms: recording unit, recording truck, recording boat, recorder, will mean the location of the array controller and the magnetic digital recording means.

The magnetic recording means will be a controlled magnetic recording disc or drum, or other clock controlled magnetic recording means.

The terms detectors, geophones, sensors, transducers will mean the devices which provide the analog signals which are entered into the acquisition system of this invention.

In the acquisition system of this invention there may be one or more recording channels each with one or more detectors connected thereto.

While this invention is most applicable to a multi-channel acquisition system, and while it is contemplated that digital signals from each channel will be transmitted in sequence to the recording unit over a single conductor pair, it is contemplated that this signal transmission can be any selected telemetering channel, including an electromagnetic radiation channel such as radio, or laser, or elastic wave channels such as in solids, liquids, or gases.

BACKGROUND OF THE INVENTION

This invention is in the field of data acquisition systems. More particularly, it is concerned with apparatus and methods for detecting analog signals at widely spaced locations, coding these signals and transmitting them as trains of single bit digital pulses over a single pair of conductors to a distant recording location.

Still more particularly it concerns a system in which a plurality of separate detectors produce analog signals which are amplified, added to a shifting function of controlled amplitude, axis-crossing-coded and transmitted by a two conductor cable to a distant recording unit.

While this invention is useful in the acquisition of any type of analog signals such as in the field of data collection, vibration analysis, sonar signaling, nuclear technology, and so on, it is most appropriately useful in the area of seismic prospecting and as a matter of convenience will be discussed in that application.

In the prior art of the seismic method it has been customary to use a large plurality of separate groups of geophones each connected by a two conductor cable which carry the geophone signals to a distant recording unit. Here each of the separate signals from each of the separate pairs of conductors is separately amplified, controlled, multiplexed and converted from analog to digital form for storage on a magnetic medium. As the number of geophones and separate recording channels has increased, in order to provide greater surface coverage, and to speed and improve the data collection, the cost and complexity of the amplifying system, etc. have become prohibitive.

SUMMARY OF THE INVENTION

It is an important object of this invention to provide a single or multiple channel recording system in which a plurality of geophones are connected separately to an apparatus which amplifies the analog signals which are added to a shifting function of selected amplitude to form a set of sum signals which are then coded in an axis-crossing-coding means to produce short pulses representing the instantaneous polarity of the sum signals. The pulses from a plurality of geophones are stored in a parallel-to-serial converter and read out on command at each of the digitizing intervals.

It is a further object of this invention to process and transmit to the recording unit all of the coded signals derived from the geophone signals as single bit digital trains in such a form that the geophone signals can be recovered without the need for the multiplicity of high gain, gain ranging, amplifiers previously used in the art.

These and other objects are realized and the limitations of the prior art are overcome in this invention by providing in the field, for example, a plurality of N array terminals. Each of these array terminals has cables for a plurality of M geophones, to which they are connected. Each of the geophone signals is amplified in a fixed gain, differential amplifier. For each geophone amplifier there is a shifting function generator which produces a shifting function of selected amplitude. These are added to the geophone signals to form a set of sum signals, which go to a corresponding set of AXC. On command from the recording unit the AXC generate short pulses which are representative of the instantaneous polarities of the sum signals.

The polarity is related to whether the sampling time is on one side or the other of the axis crossing time. These pulses are called axis-crossing-coded pulses and they are read from all of the channels in all of the array terminals in sequence.

In each array terminal the M separate channels have their pulses stored in parallel in a parallel-to-serial converter. At digitizing intervals, on command from the recording unit, the parallel-to-serial converters are unloaded in the form of serial trains of single bit pulses. The successive array terminals, which are connected in series, send out their short trains one after the other, to provide a long train of single bit serial pulses, which are sent over a two conductor cable to the recording unit.

This first train of pulses represents the instantaneous value of each of the M times N channels at the first digitizing interval. At each succeeding digitizing interval this process is repeated until the entire record of NM channels is recorded in the form of single bit pulse signals.

In the recording unit these pulse trains are recorded on a magnetic disc or drum or clock controlled magnetic recording means. The disc is driven by clock means to rotate at very constant speed. The rotating disc provides the control pulses from which all time commands are generated. This first train is stored in a first plurality of positions which are spaced apart in a selected manner on the multiple tracks of the disc. At the next digitizing interval a second train of bits is transmitted and stored. In the same manner over 8,000 repetitions of digitizing and storing can be carried out to provide a first record in storage.

Next a repetition of the initiating elastic wave signal is made and the geophone signals are gathered and processed in a similar manner to provide a second set of trains of single bit pulses which are transmitted to the disc. Here at the disc, the first record of single bit pulses is read out of the disc and the second record is read into the same first spaced storage locations. The first record is read into a second group of spaced storage spaces which will store the sums of subsequent traces.

On the third repetition, the third record is again stored in the same first spaced positions after the second record has been read out, the first record is read out from the second spaced storage positions, and is added to the second record to provide a first sum record, and that is stored in the second plurality of spaced recording positions on the disc, and so on. This process of storing and adding (compositing) the records is fully described in the copending application: DATA COMPOSITION AND ARRAY CONTROL SYSTEM now U.S. Pat. No. 3,833,725 which is entered into this application by reference.

In the recording process the geophone signals are added to shifting functions of selected amplitude. On successive sweeps, these records are effectively added or composited or stacked. This stacking of repetitive records provides a means of reducing the magnitude of the shifting function with respect to the signal, and recovering the signal. Since it is substantially impossible to transmit, in real time, at short digitizing intervals, a very large plurality of geophone signals digitized to 14 or 15 bits and transmitted over a two conductor cable, it is necessary to code the geophone signals in such a way that they can be transmitted as a single bit signal, while retaining their essential amplitude information, for later recovery.

By adding the geophone signals to the shifting functions, the axis-crossing times of the sum signals are shifted in accordance with the magnitude of the geophone signal and its polarity. This shift in the axis-crossing times is the method of carrying the amplitude information of the signal to the recording unit. This information is coded at the array terminal by the comparator amplifier, in the form of a single bit for each channel, for each digitizing interval. Thus at each digitizing interval all that has to be transmitted to the unit are a series of bits equal in number (NM) to the total number of channels.

After these single bit trains are received and recorded for all digitizing intervals, the sweep is repeated, and a second record is recorded and composited with the first. After many repeated sweeps have been composited the amplitudes of the original signal will be recovered.

BRIEF DESCRIPTION OF THE DRAWINGS

These and other objects of this invention and a better understanding of the principles and details of the invention will be evident from the following description taken in conjunction with the appended drawings in which:

FIG. 1 represents in schematic form the circuit diagram for a single channel of the recording system of this invention.

FIG. 2 represents on a probability basis an example of a shifting function which is a uniformly distributed random noise.

FIG. 3 represents how the signals and noise are added, how the axis-crossings are shifted and what the axis-crossing-coding does to the signal and what the digitized train of single bit signals looks like.

FIG. 4 shows the probability representation of the Gaussian noise that might be recorded with the geophone signal.

FIG. 5 shows in some detail one embodiment of a random noise generator.

DESCRIPTION OF THE PREFERRED EMBODIMENT

Figure 3:
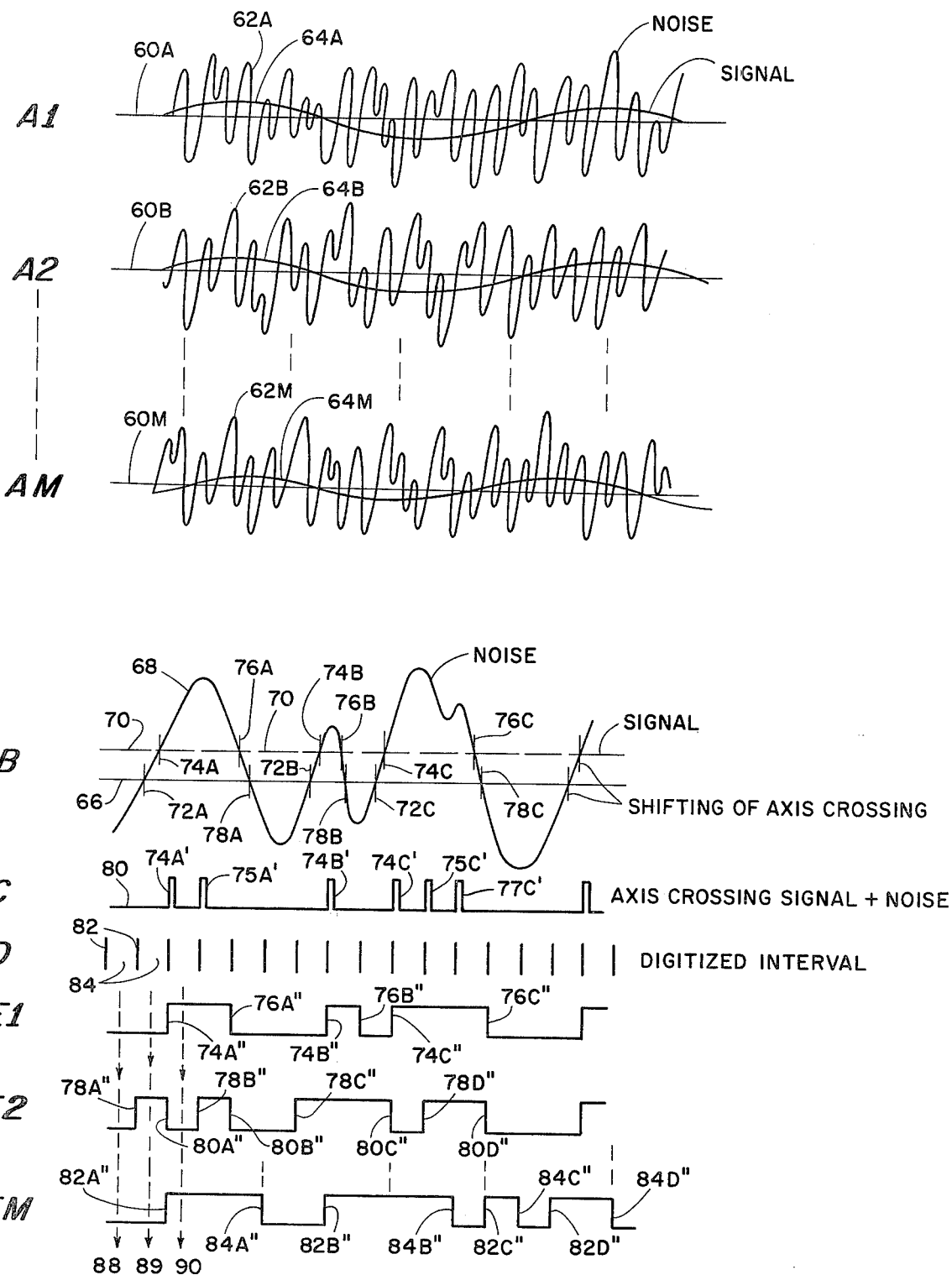

This invention is applicable to the acquisition, transport and storage of many kinds of analog signals. It is most useful, however, where signals are to be acquired at a large multiplicity of spaced locations on the earth and these signals transmitted for a considerable distance to a recording system. There are many applications of this type of signal system, such as underwater signaling applications, anti-submarine detection systems, nuclear reactor systems, vibration systems, etc. However, one of the most ideal applications of this system is in the collection of geophysical seismic data. Here many widely spaced detectors are provided, some of which are at some considerable distance from a recording unit, generally housed in an instrument cab. Since all of the cabling is portable, it is important that a minimum number of cable conductors be utilized even for a great number of independent recording channels.

Although this invention is applicable to the acquisition, transport and storage of many kinds of analog signals, it will be described, for convenience, in terms of a seismic geophysical system.

In the seismic system, as is well known, an elastic wave signal is generated in the earth by some means such as an electrohydraulic vibrator or chemical explisive. The elastic wave signal is transmitted throughout the subsurface and part of it is reflected at geologic interfaces, the reflected energy being returned to the surface where it can be detected by a plurality of spaced detectors or geophones, placed on the surface of the earch. It is this plurality of detected signals that must be collected, transmitted and stored, and it is the objective of this invention to provide such a means.

Referring now to the drawings and in particular to FIG. 1, there is shown in schematic form a diagram of the operating system of this invention. The array terminal portion is indicated generally by the numeral 10, the cable portion by the numeral 12 and the data storage portion in the recorder by numeral 14. There are a plurality of geophones 20 each connected by a pair of conductors 21, 22, in a separate circuit, or separate channel, into a parallel-to-serial converter 16. There may be any desired number of traces M, for example, which are connected into the converter 16.

In the recorder unit, or recording unit 4, there is a digital data storage means 54 comprising a magnetic disc. Associated with the disc is a central control or array controller 56 which can be programmed to carry out a number of operations on the recording channels. The control 56 operates through a multiple conductor cable connected to each of the parallel-to-serial converters 16. This comprises a two conductor cable 50 for data, and a plurality of conductors 52 for control and power purposes.

In general operation, the geophone 20 is connected by two conductors 21, 22 through a balun, which is a well known magnetic circuit device which is introduced for the purpose of minimizing any coherent signal that may appear inphase on the two conductors 21 and 22. This is called common mode rejection. A particular example of this would be highline pickup. To the extent that the signals are inphase on the two conductors, they can be reduced to a very small magnitude.

The output of the balun 24 goes to a differential amplifier 26. This is a fixed gain amplifier with isolated inputs, so that it is sensitive only to the absolute difference in potential between the two conductors leading from the geophone. In order to get maximum common mode rejection by the balun, the input impedance of the differential amplifier should be as high as possible. This is accomplished by using an FET input driver for the differential amplifier as is well known in the art.

The output of the differential amplifier 26 goes by way of lead 28 to coupling resistor 30 through junction 32 and lead 47 to a comparator amplifier 34. The comparator, also called an axis-crossing-coder (AXC), is a high gain coupling amplifier which is used for the purpose of coding the signal in accordance with the axis crossing times. The output of the AXC is a series of short time pulses having amplitudes of unity value. These are called for on command from the control 56.

A portion of this signal goes by way of lead 36 to supply power to a shifting function generator, which is a uniformly distributed noise generator 40. This will be described in detail in connection with FIG. 5. The purpose of the noise generator is to provide a random noise output containing a wide range of frequencies, wherein the probability that the amplitude of each frequency component will be a selected value is the same for all frequency components. This noise output from the noise generator goes through the adding resistor 29, through the junction 32 to the comparator 34. The purpose of the two resistors 29, 30, is to add the signal from the differential amplifier and the noise generator output to form a sum signal. The sum signal then passes to the AXC 34 where it is coded to an axis crossing signal.

As shown in FIG. 1, there are a plurality of channels 48B, 43C . . . 48M similar to channel 48A, which has just been described. All of these channels 48A, 48B, 48C . . . 48M go into the parallel-to-serial converter 16A. This is essentially a shift register into which the inputs can be entered, on command from the controller 56, by means of cable leads 52. This command to sample and store is given at frequent intervals, just prior to the command to read out the stored data. at each digitizing interval.

At each digitizing interval the control 56 will call for a serial read out of the signals stored in the parallel-to-serial converter 16A. This will, in effect, be a multiplexed signal giving the coded values of each of the channels at the instant of the sample command. On the read out command, called the interrogation command, the serial bits from converter 16A are read out onto the conductors 50 to the disc 54. Immediately thereafter the bits stored in parallel-to-serial converter 16B in a second array terminal, are red out and recorded on the disc 54, and so on to converter 16N. Thus a complete read out of the bits corresponding to each of the M traces on each of the N parallel-to-serial converters can be read out in sequence and stored on the disc 54.

The random noise produced by shifting function generator 40 has a particular statistical nature which can be represented as shown in FIG. 2. The ordinate represents noise amplitude, while the abscissa represents the probability axis. The amplitudes range from −An to +AN. The probability that all frequency components in the noise will have the same amplitude is given by the line PUD. When the signal is added to the noise, the amplitudes are all shifted up or down depending on the instantaneous amplitude and polarity of the signal, AS. Thus, the sum signal character is modified to show larger negative amplitudes (increased as shown by shaded area 51) and smaller positive amplitudes (reduced as shown by shaded area 53) respectively, when the signal is negative. When the signal amplitude is positive, the sum signal will show larger positive amplitudes and smaller negative amplitudes. By this means, the amplitude character of the geophone signal is stored in the sum signal, even though the sum signal, when placed on the cable 50 to the storage 54 is encoded to an axis crossing record of one bit.

Referring now to FIG. 4, there is shown a probability diagram, like FIG. 2, in which the ordinate is amplitude and the abscissa again is probability. This is the diagram of a Gaussian noise. This noise as represented by PG is a bell-shaped characteristic, where the amplitude of Gaussian noise is represented as +ANG or −ANG. This noise has a different statistical characteristic from that described in FIG. 2, where the noise is represented by PUD, which means that the amplitudes for all frequency conponents are uniformly distributed.

Although not shown in FIG. 4 the addition of an analog signal to this Gaussian noise would shift the amplitudes into an unsymmetrical bell-shaped characteristic so that there would be a greater preponderance of large negative amplitudes if the signal is negative and vice versa. However, the linearity of the characteristic PUD of FIG. 2 is much to be desired, and therefore the noise which is introduced at junction 32 is of the character shown in FIG. 2.

In FIG. 5 is shown a detailed circuit diagram of the noise generator 40 shown in FIG. 1. In FIG. 5 the noise generator itself is shown by the cashed bounding line 40. The lead 36 is connected to the output of the axis-crossing-coder 34. It goes to an integrator 38, the output of which goes by lead 39 to a potential inverter 37 which goes by lead 41 to the pair of diodes 43A and 43B. Diodes are designed to act as rectifiers, and when they are supplied with a normal voltage they do act as rectifiers, passing a much greater current in the forward direction than in the reverse direction. However, when the potential applied to the diode is extremely small, so that the current is in the order of magnitude of picoamperes, as is well known in the art, the diode acts as a noise generator, and puts out a wide range of frequency components.

Using two different diodes in parallel serves to make a whiter band of noise, and additional diodes in parallel would improve that situation. These are coupled by means of resistors 42A, 42B, to an amplifier 44, which has a characteristic of saturating at a selected value of output voltage. The voltage at which the amplifier saturates can be changed by adjusting the resistance of the feedback resistor 45 connected across the amplifier. Thus by varying the resistor 45 the output voltage of the noise generated in the diodes and amplified in the amplifier 44, which goes by lead 31 to the summing resistor 29, can be adjusted in magnitude. Control of the resistor 45 is by means shown in dashed line 47 so that the control of the resistor 45 can be in the array terminal or by the controller 56 at the recording station.

In the description to be carried out in connection with FIG. 3, it will be shown that the amplitudes of the noise in comparison with the amplitude of the signal is important. In any case, the noise must be greater than the signal in order to preserve the amplitude characteristic of the signal. For the kind of uniformly distributed noise of FIG. 2 the noise amplitude needs to be only slightly greater than the signal amplitude. If it is greater, than the signal will be recovered, but there will be more noise than necessary. Thus, it is desirable to add no more noise, let us say, than 1.1 times the signal. Any greater value of noise will be detrimental in that more noise will remain in the signal after the compositing operation. While the optimum range of noise amplitude to signal amplitude (or N/S ratio) would be in the range of say 1.1 to 1.5, less effective operation will be obtained for a much wider range, such as 0.25 to 5, or 0.1 to 20, for example.

Since the signal amplitude will be changing with time it becomes important that the noise introduced through resistor 29 be matched in amplitude to the signal passing through resistor 30 and that is the reason for the control 47 to vary the feedback resistor 45.

It is very seldom that a geophone signal will be entirely free of noise. There will always be more or less ground noise generated in the earth and detected by the geophone and appearing as noise with the signal that is outputed from the geophone. Because this noise is generated in the earth and is caused by a great many different sources, it will generally be found to be of a Gaussian characteristic, such as indicated in FIG. 4.

As is well known in the seismic industry, the signal to noise ratio, that is, the amplitude of the signal compared to the amplitude of the Gaussian noise in the geophone signal will vary with the time along the record. At the beginning of the record the signal will generally be higher than the noise, although at the end of the record there will come a time when the noise will be greater than the signal. In the case of Gaussian noise, it has been found that the ratio of noise amplitude to signal amplitude through the kind of circuit shown in FIG. 1, of about 3 to 1, provides an optimum operation. This compares to the value of 1.1 to 1 for the uniformly distributed noise of FIG. 2. In operation of this system it becomes important, therefore, to make a determination of the amplitude of the signal and the Gaussian noise in order to know what amplitude of uniformly distributed noise to add at the junction 32. This can be done by recording a channel of Gaussian noise, and analyzing the record by well known statistical methods.

As often as necessary in the day's operation, samples are taken of the total geophone output without the introduction of an elastic wave sweep signal into the earth. The autocorrelation of this noise trace is taken, from which the standard deviation of the noise is then given by the square root of the autocorrelation divided by the number of individual samples of the noise recorded and digitized in the test.

In the matter of determination of the noise inherent in the geophone output and the noise that is added, it must be remembered that there are essentially two kinds of noise, the noise recorded from the ground is generally Gaussian in characteristic while the noise that is added in this system is of a uniformly distributed type, and provides the possibility of true amplitude recovery of the signal.

In order to recover the signal amplitude it is necessary to reject noise in order to avoid degradation of the signal, and yet it is necessary to have a minimal level of noise for the success of the operation of axis-crossing-coding and compositing. The minimal noise level has been seen to be determined by the maximum absolute value of the signal. A nonlinear amplitude is to be avoided. If the ambient noise in Gaussian then a recovery law that is linear to within two percent of the signal amplitude is obtained when the standard deviation of the noise exceeds the maximum absolute value of the signal by a factor of 3 to 1. On the other hand, when the noise is uniformly distributed an exactly linear recovery law is obtained when the maximum absolute signal value is only slightly larger than the maximum noise amplitude. Thus uniformly distributed noise is to be preferred.

In field operations the ambient random noise can be taken to be Gaussian and the ratio of the standard deviation of the noise to the maximum absolute value of the signal must exceed 3 to . If, however, the situation is encountered where the Gaussian noise signal ratio falls below 3 to 1, then the signal recovered from the axis-crossing-coding and compositing operation is distorted and this distortion will give rise to correlated traces that have inherently lower signal to noise ratio. In this event uniformly distributed noise must be injected. Where the signal amplitude is much greater than the Gaussian noise, that is early in the record, the level of injected uniformly distributed noise need only be slightly larger than the amplitude of the signals. However, when the signal decreases to the point that the Gaussian noise is three times the amplitude of the signal then no further injection of uniformly distributed noise is required.

Referring now to FIG. 3 there will be given an explanation of the operation of this system. Consider first line Al at the top of FIG. 3. Here is shown a trace with the noise portion identified as 62A. On the average, this noise will have as much energy above as below the axis 60A. That is, its long time average amplitude will be zero. When a signal is added to this noise indicated by the curve 64A, the situation is as shown in FIG. 1 at junction 32.

In line A2 is shown a similar type of trace, which would have a similar signal added to a new and different noise at the time the second sweep is taken. Line AM represents the Mth sweep of the same channel. The noise and geophone signals are shown as 62M and 64M respectively.

It will be clear that if the combined signals, that is, the sum signals for successive sweeps, such as A1, A2 . . . AM are added, the noise being of the character of FIG. 2, the noise components will tend to be increased in amplitude in accordance with the square root of the number of sweeps, or repetitions. The signal components will tend to add up proportionately to the number of sweeps so there will be an improvement of signal to noise ratio by the simple process of adding or compositing these traces.

Unfortunately, it is not possible to composite these analog traces at the geophone, because there is no suitable way in which they can be stored as analog signals, to be progressively added to each other. Consequently, these signals must be converted, or coded, in some way so that they can be transmitted by a single pair of conductors to the recording unit and to the storage device.

In FIG. 3 line B represents to a larger time scale, a portion of one of the sum signals, in which the trace 68 represents the noise, trace 70 represents the geophone signal and trace 66 is the zero axis of the noise itself. Line B is the type of signal that appears at the junction 32. After passing through the ACX, it looks like line C of FIG. 3 where the pulses 74A', 75A , 74B', 74C', 77C', etc. represent the pulses produced by the axis-crossing-coder 34, taken on command, at each digitizing interval 82 of line D. The times represented by 82 represent the sampling times separated by digitizing intervals 84. Whenever the coding pulse is negative it is represented by a zero value 80. In other words, whenever the trace 68 of line B is sampled and is positive with respect to the signal trace 70, a positive pulse such as 74A' will be produced. When the trace is negative, no pulses will be produced. It is to be noted that when signal 70 is positive the number of positive pulses are fewer than the number of zero spaces (corresponding to negative pulses). The sum of the time intervals between axis crossings 74A to 76A between curves 68 and 70 will be less than the time between axis crossings 72A–78A between curves 68 and 66. These differences are due to the amplitude of signal 70, and are the means by which the amplitude information in 70 is statistically locked into the noise. This shifting of the axis crossing time is a function of the amplitude of the noise and the amplitude of the signal, and stores that signal amplitude for latter recovery.

In order to multiplex a plurality of signals such as trace C on to the conductors 50, it is necessary to use a clock to provide a digitizing interval. This is represented by the trace D where the times 82 are separated by digitizing intervals 84.

In control 1 all of the axis-crossing-coders in an array terminal are commanded to sample the sum signals. This produces a pulse, like 74A' on each channel 48, to be stored in the parallel-to-serial converter 16. Then on command from contrl 56 they are read out from the converter as a serial train of bits. The channels are axis-crossing-coded just prior to the digitizing interval 82 and the pulses (like 74A') stored in each channel in the register 16. Then at the clock times represented by 82 of line D these stored values are read out in serial order and the read out traces are transmitted in channel sequence through the cable 50 to the storage 54.

Assume that lines E1, E2, EM represent a group of channels 1, 2 . . . M in one array terminal. In the first digitizing interval the traces ae sampled along line 88, for example, and stored in converter 16. On command to read out, there will be a train of bits 0, 0 . . . 0. At the next digitizing interval represented by line 89, the stored and read out bits would be 0, 1 . . . 0. For the next interval 1, 0 . . . 1, and so on. These sets of bits represent the multiplexing of the M channels each digitizing interval.

These multiplexed trains of bits are recorded on disc storage 54, representing all of the digitizing intervals.

This represents one record of MN channels, where M is the number of channels in one array terminal and N is the number of array terminals. Next the sweep signal is repeated and a second record is detected, processed, transmitted to storage and stored by adding to the previous record. In this way a plurality of records can be composited, for a number of separate sweeps. In the process, the signal elements in the transmitted bit trains are added in phase, to provide a signal amplitude of K S where S is the signal amplitude of one record and K is the number of sweeps. At the same time, compositing the noise, the noise amplitude N increases as the $\sqrt{K}$ giving a composited noise amplitude N $\sqrt{K}$, giving an overall noise to signal amplitude of N/S $\sqrt{K}$.

One important area of use of this system is in a seismic prospecting program in which a plurality of sequential elastic wave signals are impressed on the earth and are received at a plurality of spaced receivers after being transmitted through the earth. It will be clear that the received signals will have a component which will be similar in timed pattern to the impressed elastic wave signal, and with it will be a certain energy of noise which is unrelated to this impressed signal. Thus the analog signal which is taken from the geophones and passed through the array terminals as shown in FIG. 1 will not be true signal, as it was impressed on the earth, but will have a certain amount of combined ground noise.

In this description, this combined signal plus ground noise as received from the geophone is considered to be the analog signal from the geophone. At completion of the transmission and storage of the sum signal, that is, after addition of the analog signal and shifting function, AXC and transmission to storage, the successive repetitions of the received signals will be composited. This process of compositing will not only detect and reconstruct the analog signal, but will reduce the magnitude of the accumulated shifting function. The process of compositing will also tend to minimize the residual amount of ground noise which is generated in the earth and is recorded with the geophone signal.

It is recognized that this noise generated in the earth will have an amplitude which may be small or larger compared to the true signal. This must be recognized and the magnitude of the noise added at junction 32 adjusted, so that the total noise will have the desired magnitude. As shown by the axis crossing record of FIG. 3, line B, the shift in axis crossing time is a function of the signal amplitude, and of the noise amplitude and frequency. It is important that the amplitude characteristic of the noise outputing from generator 40 should be optimum.

As the multiple repetitions of the elastic wave signal are recorded, they are read off of the disc and composited. The compositioned traces now have an improved signal to noise ratio. A further improvement in signal to noise ratio is possible by correlating these traces with a facsimile of the signal impressed on the earth.

This information acquisition and transmission system is ideally suited for gathering time function information from a plurality of distributed locations, processing these into the form of axis-crossing-coded signals that can be multiplexed from the entire plurality of separate channels onto a two conductor cable into the storage device. The description of this information system as a seismic system is purely coincidental and there is no limitation to the use of this system intended by its description in this manner.

Furthermore, this particular data acquisition system is intended to be used in conjunction with a plurality of array terminals and a means for controlling the data handling operations and the compositing of successive records and so on. The additional equipment and methods involved in these additional operations are described and claimed in three additional patent applications which are being filed on the same date as this application.

This system involves the addition of the amplified geophone analog signal to a shifting function prior to being axis-crossing-coded. An example of one type of shifting function, namely a random uniformly distributed noise, has been described, and circuit means shown for generating such a function. There are other types of shifting functions, such as sinusoids, sawtooth and triangular wave functions, etc. These may be constant in frequency in which case they may be random in phase. Or they can be random in frequency. Also, the shifting function can be the sum of other shifting functions. The shifting function can also be a randomly varying in amplitude low frequency, in which case the amplitude of the shifting function must be less than the amplitude of the analog signal.

While the invention has been described with a certain degree of particularity it is manifest that many changes may be made in the details of construction and the arrangement of components. It is understood that the invention is not to be limited to the specific embodiment set forth herein by way of exemplifying the invention, but the invention is to be limited only by the scope of the attached claim or claims, including the full range of equivalency to which each element or step thereof is entitled.

What is claimed:

1. In a seismic prospecting system in which a series of sequential elastic wave signals are impressed on the earth, and detected at a plurality of spaced geophones as a plurality of received signals after being transmitted through the earth, the improvement in method of acquisition, transport and storage of said signals comprising:
   a. amplifying each of the received signals to obtain a plurality of M amplified analog signals;
   b. generating a plurality of M shifting functions having selected amplitudes;
   c. adding each of said shifting functions to a different one of said amplified analog signals to obtain a plurality of M analog signals;
   d. at first selected intervals of time converting each of said analog signals to axis-crossing-coded signals;
   e. sampling at digitizing intervals said axis-crossing coded signals to form one bit digitized pulses and storing said pulses in parallel, in a parallel-to-serial converter means;
   f. at second selected intervals of time, reading out in series, said stored pulses and transmitting them in series to a storage means as a train of binary bits.

2. The method as in claim 1 in which said amplification of said signals is at constant gain.

3. The method as in claim 1 in which each of said M shifting functions are different.

4. The method as in claim 1 in which each of said M shifting functions is the same.

5. A system for the acquisition, coding, transport and storage of signals, comprising:
   a. at least one sensor means for detecting at least one physical parameter and generating an analog signal indicative of said parameter;
   b. means to amplify said analog signal;
   c. means to generate a shifting function, and means to selectively control the amplitude of said shifting functions;
   d. means to add said amplified analog signal and said shifting function to form an analog sum signal;
   e. means to axis-crossing-code said analog sum signal and at a plurality of spaced time intervals to form a time spaced train of pulses; and
   f. means to transmit said train of pulses to a storage means.

6. A system for generating, mixing, coding and transmitting electrical signals, comprising:
   a. a plurality of sensors each detecting at least one physical parameter and generating a plurality of analog signals, indicative of said parameter at each of said sensors;
   b. means to amplify said plurality of analog signals;
   c. means to generate a plurality of shifting functions and means to selectively control the amplitude of said shifting functions;
   d. means to separately add said shifting functions to each of said analog signals to form a plurality of analog sum signals;
   e. means to axis-crossing-code said plurality of analog sum signals to form pulses indicative of the instantaneous polarity of said sum signals;
   f. means to store said pulses; and
   g. means to transmit said stored pulses.

7. The system as in claim 6 in which the sensors are geophones.

8. The system as in claim 6 in which the shifting functions which are added to each of said signals are the same.

9. The system as in claim 6 in which the shifting functions which are added to each of said signals are different.

10. The systems as in claim 6 in which each of the shifting functions is greater in amplitude then the signal to which it is added.

11. The system as in claim 10 in which the shifting function to signal ratio is in the range of 1.1 to 1 to 1.5 to 1.

12. The system as in claim 6 in which the shifting function to signal ratio is in the range of 0.25 to 1 to 5 to 1.

13. The system as in claim 6 in which the shifting function to signal ratio is in the range of 0.1 to 1 to 20 to 1.

14. The system as in claim 6 in which the analog signals include Gaussian ground noise.

15. The system as in claim 14 in which the analog signal is large compared to the Gaussian noise and the uniformly distributed noise is slightly greater than the analog signal.

16. The system as in claim 14 in which the amplitude of the Gaussian noise is greater than 3 times the analog signal and the amplitude of the uniformly distributed noise is zero.

17. The system as in claim 6 in which the shifting function is a random noise having uniform distribution of amplitudes.

18. The system as in claim 1 including means to minimize common mode signals.

* * * * *